May 6, 1958 F. J. WILCOCKS 2,833,117
BRAKE SAFETY SHUT-OFF VALVE
Filed July 29, 1954
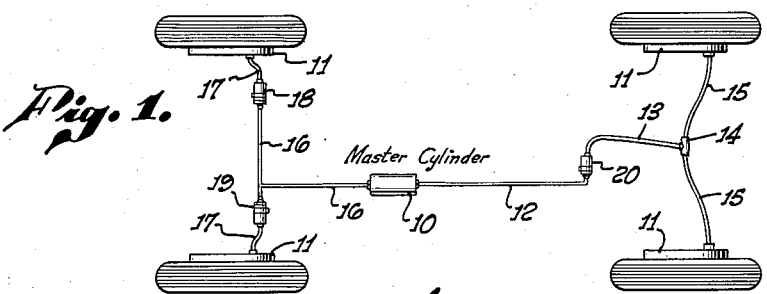
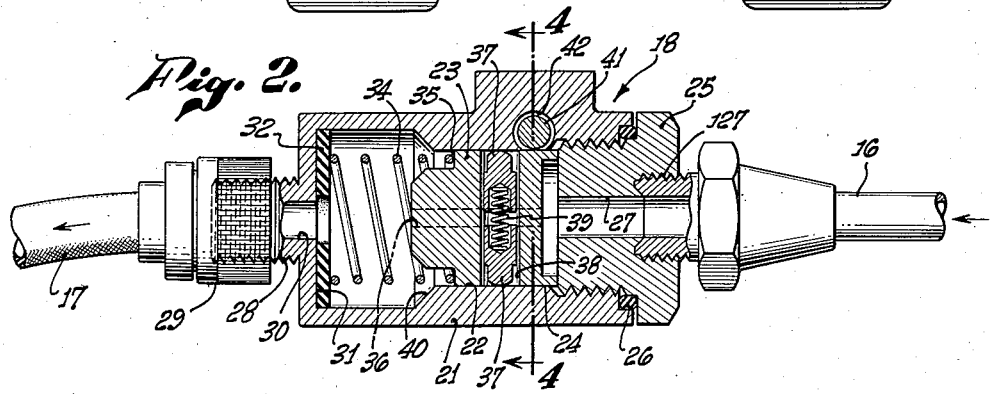
INVENTOR.
FREDERICK J. WILCOCKS,
BY William P. Green
ATTORNEY.

United States Patent Office 2,833,117
Patented May 6, 1958

2,833,117

BRAKE SAFETY SHUT-OFF VALVE

Frederick J. Wilcocks, Altadena, Calif.

Application July 29, 1954, Serial No. 446,605

6 Claims. (Cl. 60—54.5)

This invention relates to improved safety devices for fluid operated vehicle brakes.

In vehicles utilizing conventional fluid type brakes, many accidents have occurred by reason of sudden and unexpected loss of braking power while the vehicle is in operation. Such sudden loss of braking power frequently results from a rupture or leak in the fluid system, usually in the flexible tubing or lines leading to the various wheels. If one of these lines breaks, the fluid pressure to all wheels is lost, and the entire braking system then becomes inoperative.

The present invention contemplates the provision, in such a fluid operated braking system, of several safety valves, acting to automatically shut off the fluid connection to one or more of the wheels in the event of fluid leakage in the line or lines leading thereto.

As will appear, these valves are automatically responsive to a sudden drop in fluid pressure in one of the flexible lines to close off fluid flow to that line. At the same time, a particular object of the invention is to provide a valve which is pressure controlled in this manner, and yet which may be rendered unresponsive to such a pressure drop in order to allow for bleeding of fluid through the system when desired.

A device embodying the invention includes an element serving as a movable pressure responsive wall, preferably taking the form of a piston whose opposite sides may communicate respectively with the master cylinder and with one of the flexible lines of the braking system. Under normal operation, a specially designed fluid passage permits restricted communication of fluid from one side of the piston to the other. However, this passage is unable to handle the excessive flow which tends to occur when the flexible line breaks (or a leak develops in the communicating wheel cylinder). As a result, when such a break or leak occurs, the piston or other movable wall is quickly actuated in a direction acting to close a valve which seals off the ruptured or leaking line. The rest of the system then remains operative, so that the driver may bring the vehicle to a halt and thus prevent an accident.

In order to allow for bleeding of the system, I provide means for locking the valve in an open valve condition during bleeding. These locking means may comprise an element which is movably connected into the body of the valve, and is engageable in holding relation with the piston. Preferably, this element is threadedly connected into the body essentially tangentially with respect to the piston, and has an annularly cutaway portion which partically receives and is frictionally engageable with the piston.

Additional features of the invention have to do with improved means for releasably holding the piston in a closed valve condition when once actuated to that condition. For this purpose, I may employ detent means acting as a wedge for progressively camming the piston in a closing direction, after it has advanced to a nearly closed position, to thus assure very complete closure of the valve.

The detent means may include a pair of detent elements movably mounted in a common transverse passage or recess in the piston, and actuable outwardly in opposite directions by a common spring interposed between the detent elements.

The above and other features and objects of the present invention will be better understood from the following detailed description of the typical embodiment illustrated in the accompanying drawing, in which:

Fig. 1 is a diagrammatic view of the braking system of an automobile or other vehicle, and showing the manner in which the present safety shut-off valves are connected to the system;

Fig. 2 is an enlarged axial section taken through one of the shut-off valves of the Fig. 1 arrangement, the valve being shown in open condition;

Fig. 3 is a view corresponding to Fig. 2, but showing the valve in closed condition;

Fig. 4 is a transverse section taken on lines 4—4 of Fig. 2.

Fig. 5 is a transverse section taken on line 5—5 of Fig. 3; and

Fig. 6 is a fragmentary section taken on line 6—6 of Fig. 3.

Referring first to Fig. 1, the hydraulic type vehicle braking system there illustrated includes the usual master cylinder 10, within which fluid pressure is built up by actuation of a brake pedal. The hydraulic pressure developed within master cylinder 10 is communicated to the individual brake mechanisms represented at 11, which are associated with the four wheels of the vehicle. These braking mechanisms 11 of course may include conventional actuating cylinders, which are responsive to an increase in pressure within the system to apply the brakes at the various wheels, and thus stop the advancement of the vehicle.

In the conventional hydraulic braking system, the fluid lines leading to the rear wheels include a first rigid conduit or line 12, which extends rearwardly from the master cylinder, and connects to a flexible line 13. Line 13 may typically be formed of rubber or other flexible material adapted to withstand the pressure under which the system operates, with this line being usually connected by means of a T-fitting 14 with individual lines 15 leading to the two rear wheels respectively. The fluid lines leading to the front wheels include rigid lines 16, which connect to flexible lines 17 near the wheels.

The present invention is particularly concerned with the connection into the hydraulic system, at points between the rigid and flexible conduits, of three safety shut-off valves 18, 19, and 20. Each of these valves acts automatically to close in the event of sudden rupture or leakage of the flexible lines to which it is connected, to thus prevent loss of all of the fluid in the system through the ruptured line, and to maintain the rest of the system in operating condition.

Referring now to Figs. 2 and 3, each of the safety valves 18, 19 and 20 includes an outer rigid cylinder body 21, containing a cylindrical bore 22 within which is received an axially movable piston or plunger 23. Piston 23 has an outer cylindrical surface 24, which slidably engages the inner cylindrical surface 22 of body 21. If desired, the piston 23 may be sufficiently loose fitting within the cylindrical bore 22 to allow for some slight flow of liquid past the outside of the piston.

At the right end of the device as seen in Fig. 2. a plug 25 is threadedly connected into cylinder body 21. The connection between the plug and body is sealed against fluid leakage by positioning an O-ring 26 between these parts. Plug 25 contains an axially extending bore 27, through which pressure fluid from master cylinder 10 is admissible into the cylinder at the right side of piston 23. For thus placing the cylinder body in communication with the master cylinder 10, plug 25 is internally threaded at 127, to threadedly connect to one of the rigid fluid conducting lines 16 or 12.

At its left end as seen in Fig. 2, cylinder body 21 has an externally threaded tubular fitting portion 28, for connection to an internally threaded fitting 29 at the end of one of the flexible lines 17 or 13. Thus, the left-hand side of piston 23 is placed in communication with one of the fluid actuated brake mechanisms. About the inner end of the passage 30 within portion 28 of body 21, the end wall of body 21 forms an annular transverse shoulder 31, against which is positioned an annular valve seat element 32. Element 32 is typically formed of a resilient deformable sealing material, such as a suitable rubber which is resistant to the hydraulic fluid being used. Piston 23 is actuable within the cylinder body from its completely open position of Fig. 2, to the closed position of Fig. 3, in which the piston engages seat element 32 at 33 annularly about passage 30. In this condition, the piston acts to positively close off fluid communication between the interior of body 21 and passage 30. The piston is yieldingly urged toward its Fig. 2 open position by a coil spring 34, which bears at one end against seat element 32, and at the other end against an annular shoulder 35 formed on the piston.

At a location radially outwardly beyond the portion of piston 23 which engages seat 32, the piston contains an axially extending restricted fluid passage 36, which allows restricted fluid communication between opposite sides of the piston. When once actuated to its Fig. 3 closed position, piston 23 is releasably held in that position by means of a pair of detent elements or pins 37, which are received and radially movable within a common transverse or diametrical passage 38 formed in piston 23. A coil spring 39 is positioned within this passage 38 between the two detent elements 37, and acts to yieldingly urge elements 37 radially outwardly in opposite directions with respect to the piston. When piston 23 reaches a position near its Fig. 3 closed position, detent elements 37 move into engagement with a flaring annular wedge surface 40 formed in the wall of cylinder body 21. This wedge surface 40 is preferably of frusto-conical configuration, and is disposed at such an angle to the cylinder axis (say about 45°) as to cause the outwardly urged detent elements 37 to cam or wedge piston 23 axially toward and into tight sealing engagement with seat element 32. Thus, piston 23 is held tightly against its seat 32 regardless of whether the piston or seat element may become slightly worn, and without the necessity for maintaining extremely close tolerances in the manufacture of the detenting elements.

In bleeding the system, it is desirable to lock piston 23 in its open Fig. 2 position. For this purpose, I provide a locking member 41, which preferably comprises a screw threadedly connected into a threaded bore formed in cylinder body 21. This screw and bore extend essentially tangentially with respect to the outer surface 24 of piston 23, with the bore 42 preferably intersecting the main cylindrical bore 22 in body 21 to about the extent indicated in Fig. 4. At the location of bore 22 (when screw 41 is tightened all the way into its bore 42), the screw is annularly cut away at 43, at an arcuate curvature corresponding substantially to the curvature of bore 22. This cutaway portion of screw 41 is so designed as to leave slight clearance at 44 between the screw and piston when the screw is entirely tightened into its Fig. 4 position within the body. However, if the screw is loosened slightly, the cutaway portion 43 of the screw frictionally engages the outer surface 24 of the piston, and thus locks the piston in its open Fig. 2 position. This lock may of course be very easily released at any time by merely retightening the screw 41 into the body. A seal ring 45 is provided about screw 41 for preventing fluid leakage from the body along the screw. The tightening and loosening of the screw is of course effected by means of a suitable wrench or other tool acting against the outer hexagonal head 46 of the screw.

In order to facilitate connection of lines 16 and 17 to the body 21, the portion of body 21 at the location of locking screw 41 may have the rectangular or flat-sided cross-sectional configuration illustrated in Figs. 4 and 5. Consequently, a suitable wrench may be applied directly to this portion of the body, during connection of the lines to the body. Also, the flat portions at opposite sides of body 21 may be extended along the entire length of the body at a pair of opposite locations 47, to allow engagement of a wrench with these extended flats on the body.

During normal operation of the illustrated braking system, piston 23 moves only very slightly within the cylinder body, and never engages valve seat element 32. When the brakes are applied, and pressure is built up in the system by master cylinder 10, the increase in pressure is transmitted through cylinder body 21 and to the flexible lines leading to the individual wheel cylinders, with the valves 18, 19, and 20 having substantially no effect on the braking operation. Piston 23 is free for limited movement within cylinder 21 to transmit such braking pressure, and at the same time passage 36 in the piston allows some fluid flow through the piston to minimize the amount of piston movement that is required. If, however, one of the flexible lines 13, 15 or 17 breaks, or one of the wheel cylinders develops a substantial leak, the resultant sudden decrease in fluid pressure at the left side of piston 23 as seen in Fig. 2 creates a pressure differential at opposite sides of the piston (when the brakes are applied), which differential causes piston 23 to rapidly move to the left to its closed Fig. 3 position, in which position it is tightly held by the engagement of detent elements 37 with wedge surface 40. As will be understood, passage 36 through the piston is sufficiently restricted as to be incapable of handling the excessive fluid flow which tends to pass through cylinder body 21 when a substantial break or leak occurs, and it is for this reason that the resultant pressure differential causes closing movement of the piston. When once closed, piston 23 prevents further flow of liquid from the cylinder body into passage 30 leading to the ruptured or leaking line, to thus seal off the leaking portion of the system so that the braking mechanism of the remaining wheels will still function effectively. To offer the desired restriction, passage 36 should have a cross-sectional area which is very small as compared with the cross-sectional area of the piston itself. As a typical example, where the piston is about .681" in diameter, the passage 36 may be of a diameter of about .093". Preferably for other size pistons, the piston and passage areas are maintained at about the same ratio as where the two diameters have the values of this typical example.

When it is desired to bleed the system, screw 41 is loosened slightly to the left as seen in Fig. 4, to bring the cutaway portion 43 of the screw into tight frictional engagement with outer surface 24 of the piston, to thus tightly retain the piston in its open Fig. 2 position. Fluid may then be bled through the system and through passage 36 in the piston, without any danger of actuation of the piston to its closed position of engagement with seat element 32. After the bleeding operation is completed, screw 41 is again tightened to its released Fig. 4 position, to again render piston 23 responsive to pressure changes.

Preferably the cylinder bodies 21 are mounted to the vehicle in a manner such that the axes of the cylinder bodies extend directly transversely of the direction of advancement of the vehicle. Such disposition of the valves prevents accidental and unwanted actuation of pistons 23 to their closed positions as a result of the sudden starting or stopping of the vehicle.

After the piston has been actuated to its closed Fig. 3 position by a break or leak in one of the flexible lines or a connected part, the flexible line is usually detached from cylinder body 21 for replacement or repair, and is then reconnected to the cylinder body after the repair has been completed. While the fitting 29 at the end of the flexible line is thus detached from the cylinder body, piston 23 may be easily actuated to its Fig. 2 released position, by insertion of any suitable elongated element (such as a nail) into the cylinder body through passage 30. This elongated element is pushed against piston 23 with the force to overcome the force of detent pressing spring 39, and to actuate the piston to the Fig. 2 position, at the same time camming detent elements 37 inwardly to their retracted Fig. 2 positions.

I claim:

1. A brake safety valve comprising a cylinder body, an axially movable piston in said cylinder, a first fluid connection for placing said cylinder body at a first side of the piston in communication with the master cylinder of a braking system, a second fluid connection for placing the cylinder body at the other side of the piston in communication with a fluid actuated brake mechanism, means forming a fluid passage placing said opposite sides of the piston in restricted communication, a valve seat in said cylinder body at said other side of the piston and facing toward the piston, said piston having a valve portion operable upon axial movement of the piston to engage said seat and acting when engaged therewith to close off communication between said passage and said second fluid connection, a spring yieldingly urging said piston away from engagement with said seat, said spring being sufficiently strong to retain said valve portion of the piston out of closing engagement with the seat during normal brake applying actuation of said brake mechanism by pressure from said master cylinder, said passage being sufficiently restricted to cause movement of said piston into valve closing engagement with said seat upon a sudden decrease in pressure at said other side of the piston resulting from rupture of a fluid line communicating with said second fluid connection, a releasable spring urged detent mechanism for locking said piston in a position of engagement with said seat after said actuation into engagement with the seat by said sudden decrease in pressure at said other side of the piston, and releasable holding means operable to positively lock said piston in an open valve condition and against movement toward said seat to thereby permit bleeding of the system through said restricted passage without closure of the valve.

2. A brake safety valve as recited in claim 1, in which said second holding means comprise an element threadedly connected into said cylinder body essentially tangentially with respect to an outer surface of said piston and having an annularly cutaway portion partially receiving and frictionally engageable with said piston.

3. A brake safety valve as recited in claim 1, in which said passage is formed in said piston at a location laterally offset from said second fluid connection.

4. A brake safety valve as recited in claim 1, in which said detent mechanism includes a spring urged detent element and an engaged wedge surface against which the detent element bears in a relation tending to cam the piston to its closed position of engagement with said seat and then tending to cam the piston beyond said position to hold the valve tightly in closed position.

5. A brake safety valve as recited in claim 1, in which said detent mechanism comprises a pair of spring pressed detent elements contained within and projecting in opposite directions from a transverse recess in said piston, a spring between said detent elements urging them outwardly, and an inclined wedge shoulder in said cylinder engageable by said detent elements to cam said piston progressively against said seat in fluid tight engagement therewith and tending to cam said piston beyond a closed position of engagement with said seat, said second holding means comprising a lock element threadedly connected into said cylinder body essentially tangentially with respect to an outer surface of said piston and having an annularly cutaway portion partially receiving and frictionally engageable with said piston, said seat being an elastomeric element positioned against an end wall of the cylinder and having an opening communicating with said second fluid connection, said passage being formed in said piston at a location laterally offset from said opening in the elastomeric seat element.

6. A brake safety valve comprising a body containing a chamber, a movable fluid pressure responsive wall dividing said chamber into two compartments and movable in opposite directions to relatively inversely vary the volumes of said compartments, a first fluid connection for placing one of said compartments in communication with the master cylinder of a vehicle braking system, a second fluid connection for placing the other compartment in communication with a second cylinder which operates a wheel brake, means forming a restricted fluid passage placing said compartments in restricted communication past said wall and thereby placing said two connections in communication, a valve seat in said body at the side of said wall at which said other compartment is located and facing toward said wall, a valve element movable with said wall and operable upon movement therewith toward said other compartment to close off said communication between said connections through said passage, a spring yieldingly urging said wall toward one compartment and to a position in which said valve element is out of closing alignment with said seat, said spring being sufficiently strong to retain said valve element in an open position away from said seat during normal brake applying operation of a piston in said master cylinder, said passage being sufficiently restricted to cause closure of said valve element against said seat by fluid actuated movement of said wall upon a sudden decrease in pressure in said other compartment resulting from rupture of a fluid line leading to the second cylinder, a releasable spring urged detent mechanism for locking said valve element in a position of engagement with said seat after said actuation into engagement with the seat by said sudden decrease in pressure in said other compartment, and releasable holding means operable to positively lock said wall and valve element in said open valve position and against movement toward said seat to thereby permit bleeding of the system through said restricted passage without closure of the valve element.

References Cited in the file of this patent

UNITED STATES PATENTS

| | | |
|---|---|---|
| 1,285,980 | Gilman | Nov. 26, 1918 |
| 2,093,015 | Madden | Sept. 14, 1937 |
| 2,127,849 | Stone | Aug. 23, 1938 |
| 2,340,462 | Gallup et al. | Feb. 1, 1944 |